Dec. 27, 1955   P. S. MACGREGOR   2,728,590
SELF-ENGAGING AND SELF-SEALING PIPE COUPLINGS, ESPECIALLY
APPLICABLE TO FLIGHT REFUELLING PURPOSES
Filed Sept. 25, 1952   2 Sheets-Sheet 1

INVENTOR
Peter S. Macgregor
By: Watson, Cole, Grindle & Watson
ATTORNEYS

United States Patent Office 2,728,590
Patented Dec. 27, 1955

2,728,590

SELF-ENGAGING AND SELF-SEALING PIPE COUPLINGS, ESPECIALLY APPLICABLE TO FLIGHT REFUELLING PURPOSES

Peter Stevens Macgregor, Upton, Poole, England, assignor to Flight Refuelling Limited, London, England, a British company Application September 25, 1952, Serial No. 311,402

Claims priority, application Great Britain February 29, 1952

6 Claims. (Cl. 284—19)

This invention relates to a self-engaging self-sealing plug-and-socket type pipe-coupling of the kind in which the plug member, constituted by a nozzle, is provided with a valve, which seals the opening of the nozzle when the coupling is disconnected and which is opened automatically on bringing the nozzle and socket member into coupling engagement.

An object of the invention is an improved automatically operable valve for such a coupling.

Another object is an improved coupling nozzle and valve which will substantially eliminate spillage from the coupling if parted while still filled with liquid.

The following description with reference to the accompanying drawings of a typical coupling according to the invention is given by way of example only without implied limitation of the scope of the invention, which is defined in the appended claims.

Figure 1:
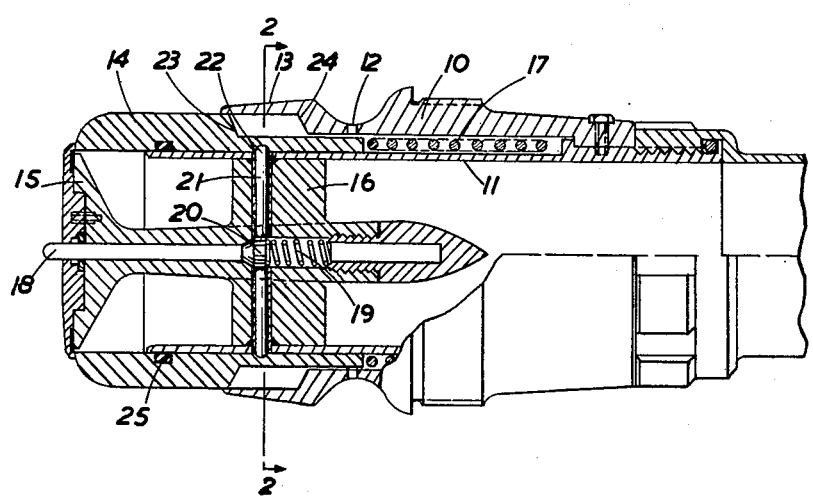
Figure 1 is a side elevation of a coupling plug member in the form of a nozzle, partly sectioned on the line 1—1 of Figure 2, the nozzle valve being closed.
Figure 2:
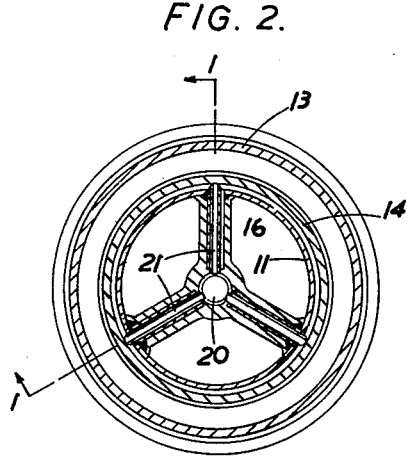
Figure 2 is a section on the line 2—2 of Figure 1.

Referring to the drawings, the nozzle comprises a body 10 to which is rigidly secured an internal sleeve 11. The nozzle body 10 has an external circumferential groove 12 and a tapered portion 13 in front of the groove. In the space between the nozzle body and the fixed sleeve 11 is mounted a sleeve 14 which constitutes the extremity of the nozzle and can slide axially in the nozzle body. When this sleeve is in the extended position, as shown in Figure 1, a portion of it, namely, the inner margin of its front end, seats on a valve poppet 15, the stem of which is formed integrally with a spider 16 which is permanently secured to the sleeve 11, for instance by welding. The sleeve 14 is loaded by a spring 17 which is enclosed in the space between the nozzle body 10 and the fixed sleeve 11 and acts to press the sleeve 14 towards the extended position in which it seats on the poppet 15. The sliding joint between the sleeve 11 and the sliding sleeve 14 is sealed by means of a sealing ring 25.

Figure 3:
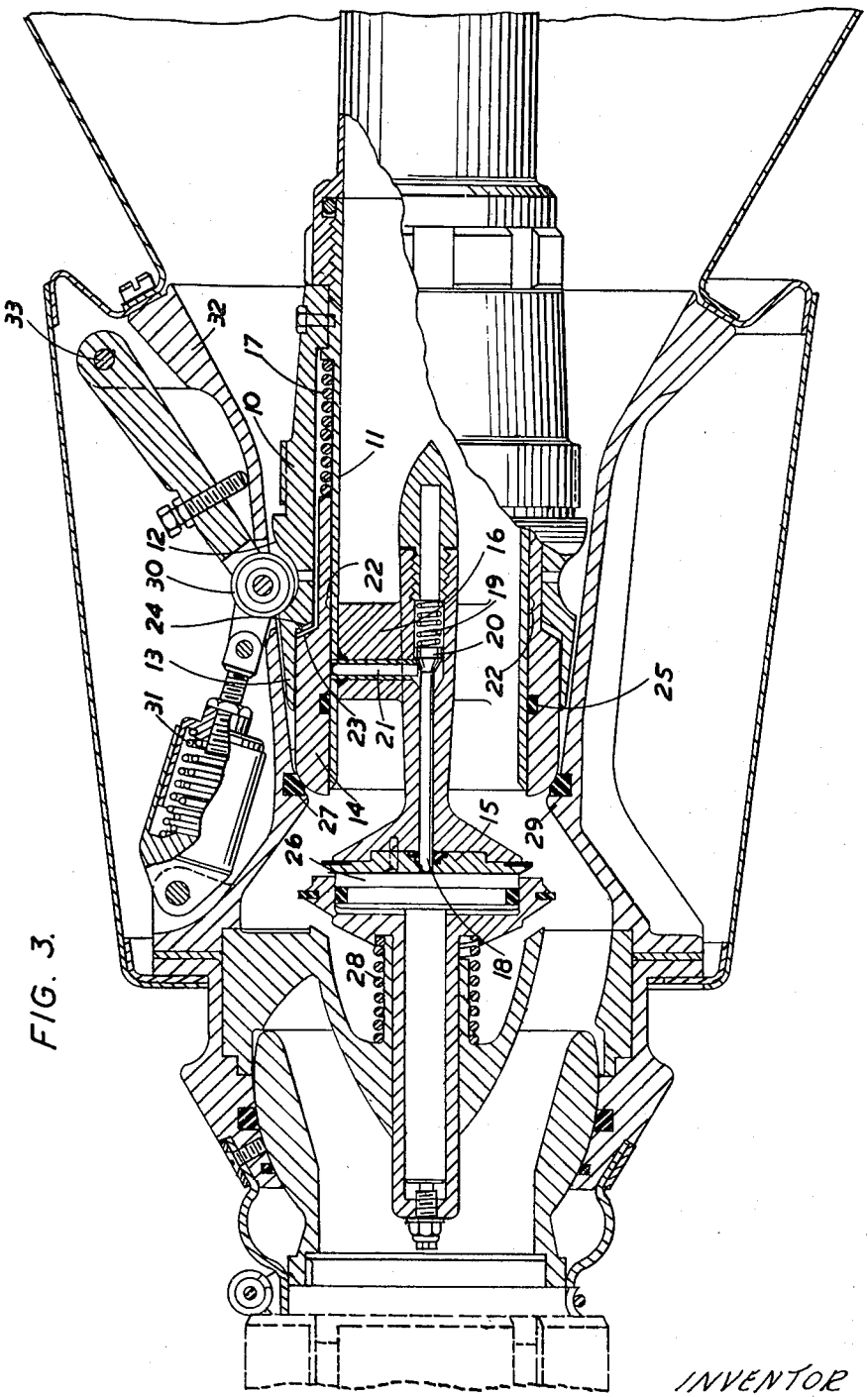
Figure 3 is a view similar to Figure 1, and including the coupling socket, the nozzle valve being open.

The poppet 15 is centrally bored to accommodate a sliding plunger 18 and a spring 19 which presses the plunger towards a position in which its extremity projects from the face of the poppet 15 as shown in Figure 1. In this position an enlargement 20 of the plunger 18 engages the inner ends of radially disposed pins 21 which are mounted to slide in the arms of the spider 16, so as to cause the outer ends of the pins 21 to project through the sleeve 11 and engage a circumferential groove 22 on the inner face of the sliding sleeve 14, when the latter is in the extended position as shown in Figure 1. Pins 21 and groove 22 thus constitute a latching device which normally locks the sleeve 14 in the extended position, and it will be readily perceived from an inspection of Figure 3 of the drawings that the groove 22 is arcuate in cross-section and that the ends of the pins 21 are substantially spherical, whereby movement of the sleeve, when the locking member 18, 20 is restricted, cams the pins radially inwardly out of latching position.

When the nozzle is inserted into the socket member 32 of the coupling (see Figure 3) the plunger meets an obstruction 26 mounted in the socket member 25 and is thereby driven inwards against the spring 19 so that the inner ends of the pins 21 register with the small diameter portion of the plunger 18, thereby freeing the pins 21 to move inwards until their outer ends no longer project from the fixed sleeve 11, thus releasing the latching device.

As the insertion of the nozzle into the socket member continues, the rounded outer margin of the end of the sleeve 14 constituting the extremity of the nozzle meets a sealing ring 27 in the socket member, and as the nozzle continues to advance, the sleeve 14 is pressed back relatively to the nozzle body 10 against the effort of spring 17, being now free to move owing to the releasing of the latching device.

When the nozzle is withdrawn from the socket member of the coupling, the spring 17 presses the sliding sleeve 14 towards the extended position at the same time holding it in contact with the sealing ring of the socket member until it has met the poppet 15 and closed the nozzle. When the sliding sleeve 14 has reached the fully extended position and seated on the poppet 15, further withdrawal of the nozzle causes the face of the poppet 15, up to now in contact with the obstruction 26 mentioned above, to recede from this obstruction and allow spring 19 to press the plunger 18 into its forwardly projecting position. The forward face of the plunger enlargement 20 is of conical profile and acts as a wedge to press the pins 21 outwardly and engage in the groove 22 as the plunger 18 moves outwards. When the plunger 18 is in the fully extended position a cylindrical portion of the enlargement 20 registers with the pins 21, thus positively locking them in the extended position engaging the groove 22.

It will be evident from inspection of the drawing that in the movements of engaging and disengaging the coupling, the obstruction 26 encountered by the plunger 18 is axially displaced relatively to the sealing ring 27 encountered by the sliding sleeve 14. The sealing ring 27 is a fixed part of the socket member, and the obstruction 26 encountered by the plunger 18, and by the poppet 15 when the plunger has been driven fully in, is part of a valve poppet 35 loaded by a spring 28 to seat on a fixed seating 29 and close the throat of the socket member, except when moved off its seating by the nozzle valve poppet 15 as in Figure 3.

During the insertion of the nozzle into the socket member the taper 13 of the nozzle body 10 encounters spring-loaded latching devices 30 pivoted at 33 on the socket member 32 and loaded by springs 31, and springs them apart until they spring into the groove 12 of the nozzle body to latch the nozzle to the socket member.

The several parts are so proportioned that the latches 30 do not engage the groove 12 until the sliding sleeve 14 has been pressed in as far as it will go or nearly so, its inward travel being limited by a shoulder 23 on the sleeve 14 which meets a corresponding shoulder 24 on the nozzle body 10.

I claim:

1. In a plug-and-socket type pipe-coupling, the sub-combination constituting the plug member of the coupling and comprising a nozzle, a valve member carried by the nozzle, projecting therefrom, and disposed in fixed concentric relation to the nozzle so as to leave an annular outwardly facing gap between the valve member and the end of the nozzle, a sleeve supported concentrically upon and slidable with respect to the nozzle between a position in which it exposes at least a portion of said gap and a position in which it seats against the valve member and closes said gap, sealing means between the slidable sleeve and the nozzle, spring means carried by the nozzle and operatively contacting the slidable sleeve and tending to seat the slidable sleeve on the valve member, latching mechanism carried by the nozzle and movable in relation to said sleeve to retain said slidable sleeve in seated position, a latch locking and releasing member carried by said nozzle and movable with respect to said latching mechanism between a position in which it locks said latching mechanism in sleeve-retaining position and projects from an exposed face of the valve member and a position in which it does not so project and in which it releases said latching mechanism to allow said slidable sleeve to be moved to said gap-exposing position, the sleeve and latching mechanism having means whereby sliding movement of the sleeve automatically disengages the latching mechanism when said locking member is out of latch locking position, and spring means carried by said nozzle and operatively connected to said last named member and tending to move said last-named member to latch-locking, projecting position.

2. The sub-combination as defined in claim 1, wherein there is provided an annular groove in the slidable sleeve and opening toward said latching mechanism, and in which the latching mechanism includes members mounted in said nozzle and movable radially between a position in which they engage said groove to retain the slidable sleeve in seated position and a slidable-sleeve-releasing position, and in which the latch-locking and -releasing member is axially slidable in the valve member and has an enlarged head disposed adjacent said radially movable members and having a tapered part and a cylindrical part, which head engages the radially movable members to displace them to groove-engaging position when the latch-locking and releasing member is moved to the position in which it projects from the valve face.

3. In combination, the sub-combination as claimed in claim 1 and a socket member comprising part of a cooperating socket portion of said coupling and having a nozzle-receiving throat and comprising a fixed seating engageable with the slidable sleeve of the nozzle on entry of said nozzle into the socket member to move said slidable sleeve to gap-exposing position, and an abutment carried by said socket member in axially spaced relationship to said seating, the axial protrusion of said latch locking and releasing member in locking position being such that when said latch locking and releasing member contacts said abutment, the slidable sleeve is still spaced axially from the seating a distance at least equal to the necessary movement of the latch locking and releasing member to latch releasing position.

4. The combination as claimed in claim 3 in which there is provided a circumferential groove in the nozzle and spring-loaded latch means mounted on the socket member and engageable with said last-named groove on entry of the nozzle into the socket member.

5. In combination, the sub-combination as claimed in claim 1 and a socket member comprising part of a cooperating socket portion of said coupling and having a nozzle-receiving throat and comprising a fixed seating engageable with the slidable sleeve of the nozzle on entry of said nozzle into the socket member to move said slidable sleeve relatively to said nozzle to gap-exposing position, a second fixed seating in the socket member, a valve member in said socket member axially movable inwards from said last-named seating, spring means carried by said socket member and tending to hold said last-named valve member on its seating, said last named valve member being axially spaced from the other seating, and the axial protrusion of said latch locking and releasing member from the face of said first named valve member in locking position being such that upon entry of the nozzle into the socket member, when said latch locking and releasing member contacts the second named valve member, the slidable sleeve is still spaced axially from said first named seating a distance at least equal to the necessary movement of the latch locking and releasing member to latch releasing position, said first named valve member adapted then to abut said second named valve member to move the latter off its own seating.

6. In combination, a pipe-coupling member as claimed in claim 1 and a pipe-coupling socket member comprising part of a cooperating socket portion of said coupling and having a nozzle-receiving throat and comprising a fixed seating engageable with the slidable sleeve of the nozzle on entry of said nozzle into the socket member to move said slidable sleeve relatively to the nozzle to gap-exposing position, a second fixed seating in the socket member, a valve member in said socket member axially movable inwards from said last-named seating, spring means carried by said socket member and tending to hold said last-named valve member on said last-named seating, said last-named spring means being stronger than the spring means acting on the latch-locking and -releasing member of the nozzle, and said last-named valve member being so positioned and the axial protrusion of said latch locking and releasing member from the face of the first named valve member in locking position being such that when said latch locking and releasing member contacts said second named valve member, the slidable sleeve is still spaced axially from the first named seating a distance at least equal to the necessary movement of the latch locking and releasing member to latch releasing position.

References Cited in the file of this patent

UNITED STATES PATENTS

| 1,968,421 | Proctor | July 31, 1934 |
| 2,314,208 | Gurewitsch | Mar. 16, 1943 |
| 2,449,938 | Hansen | Sept. 21, 1948 |
| 2,553,680 | Scheiwer | May 22, 1951 |
| 2,634,926 | Worlidge | Apr. 14, 1953 |